United States Patent [19]

Hull et al.

[11] Patent Number: 4,757,590

[45] Date of Patent: Jul. 19, 1988

[54] METHOD AND APPARATUS FOR REMOVING SNAP RINGS

[76] Inventors: Norman P. Hull; Norman D. Hull, both of 479 S. Dudley St., Lakewood, Colo. 80226

[21] Appl. No.: 928,829

[22] Filed: Nov. 10, 1986

[51] Int. Cl.[4] .............................................. B23P 19/04

[52] U.S. Cl. ..................................... 29/426.6; 29/229; 29/235; 29/249

[58] Field of Search ................. 29/229, 249, 235, 451, 29/453, 270, 426.6; 81/124.7, 437, 53.2, 302, 385, 393, 8.1

[56] References Cited

U.S. PATENT DOCUMENTS

| | | | |
|---|---|---|---|
| 4,004,338 | 1/1977 | Breitbach | 29/229 |
| 4,175,310 | 11/1979 | Boyd | 29/229 |
| 4,689,865 | 9/1987 | Chamblee | 29/229 |

*Primary Examiner*—Timothy V. Eley

*Attorney, Agent, or Firm*—Edwin L. Spangler, Jr.

[57] ABSTRACT

This invention relates to a set of tools for removing lugless snap rings from the internal annular grooves provided therefor in parts containing internal bores, these tools consisting of a pointed tool for making an indentation in the base of the groove between the ends of the ring, a plunger-actuated ball magazine for placing a ball in the indentation thus formed preparatory to driving the ring aroung in its groove until one of its ends rides up upon the ball to create a gap therebeneath, a clamping tool for holding the ring in its groove against further relative rotation, a wedge for movement into the gap underneath the raised end of the ring, and a wedge-driving subassembly for moving the wedge into the gap to a point where the raised end of the ring is free of the groove and in position to be grasped and removed. The invention also encompasses the novel method for removing lugless snap rings that includes the steps of making an indentation in the base of the groove between the ends of the ring, inserting a ball in the indentation, rotating the ring within its groove until one of its ends rides up upon the ball creating a gap therebeneath, holding the ring in the groove against further relative rotation, driving a wedge into the gap underneath the ring until the raised end thereof is free of the groove, and pulling upon the end thus freed to remove the ring.

10 Claims, 3 Drawing Sheets

80

METHOD AND APPARATUS FOR REMOVING SNAP RINGS

BACKGROUND OF THE INVENTION

Snap rings have long been used as retainers for removably fastening parts, particularly cylindrical ones, inside cylindrical bores and the like. These rings are split and of uniform thickness end-to-end; however, their width varies in that they generally have a rather wide medial portion tapering in both directions down toward each end where the much wider apertured lugs are located. Suitable plier-like tools having blunted pins for jaws are insertable into the apertures in the lugs and used to spring the ends of the ring together thus releasing the latter from its mounting groove in the bore. The narrowed portions between the medial section and each lug allow for enough spring in the ring to effect its release from the groove. Obviously, upon removal of the snap ring, withdrawal of the retained part becomes possible.

The problem arises when one or both of the lugs break off and there is nothing left for the conventional tool to grab onto. If only one lug is missing, it is oftentimes possible to use an eccentrically-pinned tool like that shown in Boyd's U.S. Pat. No. 4,175,310 to pry at least one end of the ring free of the groove, whereupon, it can generally be extracted by getting a prying tool of some type behind it and working the latter around to the end having the broken-off lug without permitting the end that still has the lug from reentering the groove.

A much greater problem exists when both lugs are broken off because there is no hole left to receive the pin of the removal tool. Even in those instances where enough of one of the lugs remains to grab onto with a plier-like tool but there is no space underneath it due to the close proximity of the retained part or so-called "endplate", the removal of the ring becomes a very difficult chore and one that has been handled in the past all too often by employing techniques, some of which will be outlined later, that end up damaging, if not effectively destroying the cylinder in which the ring is mounted. Most of these techniques are time-consuming, expensive and, most important, destructive of one part of the assembly.

A still further complication is the presence of a center shaft projecting from the endplate which so crowds the workspace that even getting the tool near the broken snap ring ends becomes difficult to say nothing of having enough room to manipulate the ring once it has been gotten ahold of in some fashion.

FIELD OF THE INVENTION

This invention relates to the removal of broken snap rings and, more particularly, to those in which both end lugs have been broken off. The invention involves the tools used in the removal of the broken ring without having to destroy or otherwise seriously damage the groove in which it is seated and, in addition, the methods employed in the removal which vary depending on the particular assembly in which the snap ring is situated.

It is, therefore, the principal object of the present invention to provide a novel and unique apparatus for removing broken snap rings.

A second objective of the invention herein disclosed and claimed is the provision of a method by which such broken rings can be removed without damaging the groove in which the ring is seated in any way that would materially affect its ability to accept and retain a new ring.

Another object is to provide an assortment of tools which when used in various combinations can effect the removal of broken rings under a wide variety of different conditions.

Still another objective is the provision of a set of tools of the character described which are uniquely adapted to grasp and remove even those rings which abut snugly up against an endplate.

An additional object is to provide a method and apparatus for removing broken snap rings that does not entail boring out or otherwise damaging the support therefor.

Further objects are to provide a broken snap ring removal kit which is simple, easy to use, effective, versatile, dependable, compact, rugged and even somewhat decorative.

Other objects will be in part apparent and in part pointed out specifically in the material which follows.

DESCRIPTION OF THE RELATED ART

A search of the prior art has revealed only two patents, namely, Wolny's U.S. Pat. No. 3,106,233 and Day's U.S. Pat. No. 4,084,454, both of which deal with screw removal tools and have no pertinency with respect to the removal of broken snap rings where both tabs are missing.

As far as applicants are aware, the conventional techniques for taking care of the problem involve more or less standard metal-working procedures as opposed to specialized tools. For instance, one rather obvious method is to disassemble the cylindrical snap ring carrier from whatever it is mounted in and drill through from the outside into the groove where, hopefully, one can push enough of the ring free of the groove to get ahold of it. The problem with this technique is that all too often the cylinder is made of extremely hard material that is very difficult to drill.

Another approach is to thin down the ring by grinding away at some portion of it accessible inside the cylinder until it can be bent at the weakened area and removed. Here again, these rings are very hard and, therefore, most difficult to grind away. Moreover, such an operation is very hard to carry out without damaging the groove or the cylinder wall.

Still another technique is essentially that of boring out the cylinder to a diameter equivalent to the depth of the groove so that the ring can be accessed and lifted out. Generally speaking however, this is not a satisfactory solution even if the cylinder is soft and easily bored in that a sleeve must be inserted in place of the bored-out material which has to bear the load under the new ring which may be considerable.

About the only really satisfactory solution to the problem is to use the so-called "EDM" or electro-discharge machining method wherein an electrode flooded with coolant is impressed against the ring and when the electrode is fired, it produces a very powerful spark that virtually powders the metal as it is instantly cooled. The obvious advantage, of course, is that the cylinder and its groove are left intact. On the minus side, however, is the fact that this is a very expensive operation requiring specialized equipment generally available only in the aerospace industry where it is used to remove broken tabs and the like from very valuable parts.

SUMMARY OF THE INVENTION

The present invention comprises a series of different tools, the first of which enables one to place a dimple in the bottom of the groove in the space left between the ends of a broken ring. Various adjustable spacers can be used with this dimpling tool to bridge across to the center shaft or opposite side of the bore in order to apply sufficient force to make the dimple. A second tool places a ball in the dimple and this ball provides a rolling surface used in camming the ring out far enough so that a wedge can be placed therebehind in the groove when the ring is driven around the groove into position to ride up on the latter. Once this has been accomplished, the dimpling tool either alone or together with a spreader functions as a clamp for holding the ring against rotation while a prying tool and associated wedge-driving tool are rigged to cooperate with one another to drive the wedge into position beneath the ring such that it is free enough of the groove to be removed. The invention also encompasses the unique methods employed in the removal of the broken rings under various assembly options often faced in the field.

DESCRIPTION OF THE PREFERRED EMBODIMENTS

Figure 1:
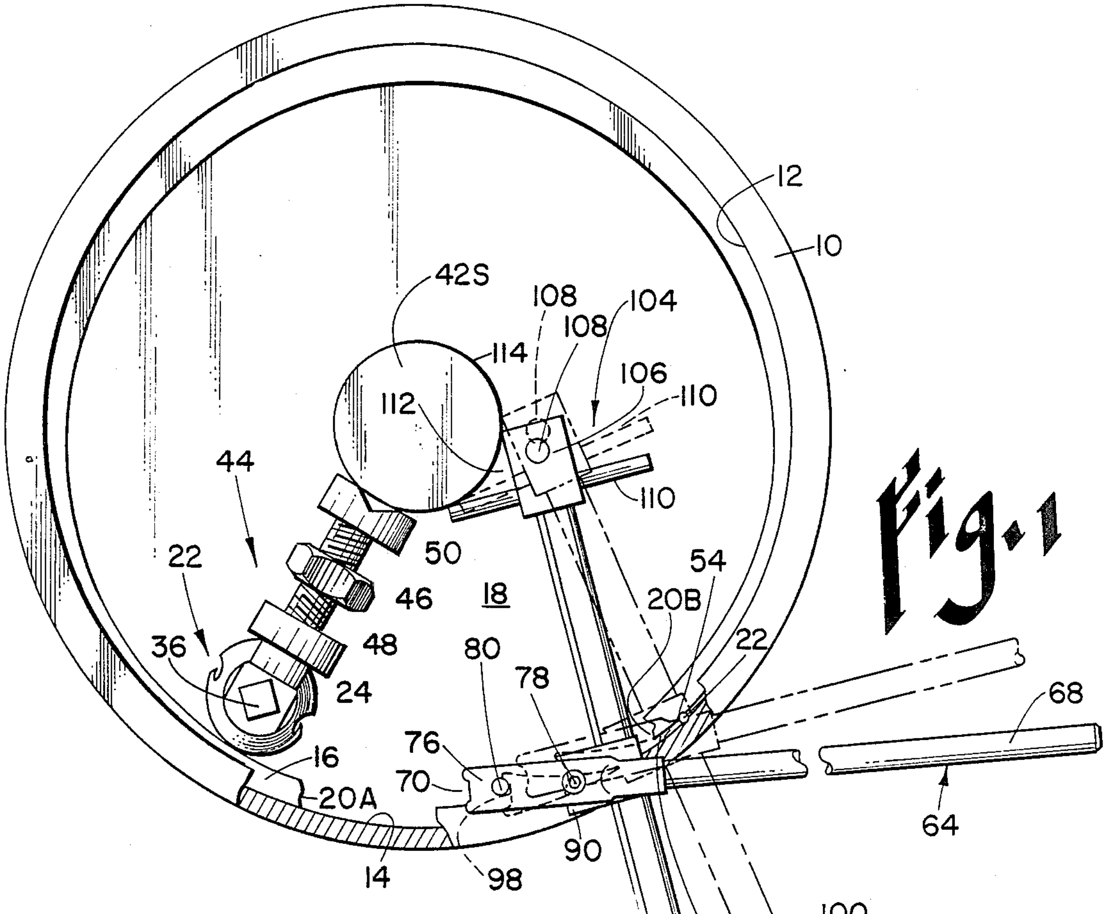
FIG. 1 is a plan view, portions of which have been broken away to more clearly reveal the interior construction, showing the prying tool and wedge driving tool cooperating to drive a wedge in underneath one end of the broken snap ring in an assembly having a small center shaft along with the use of the dimpling tool and spreader to clamp the ring against rotation while the wedge is being driven.

Referring next to the drawings for a detailed description of the present invention and, initially, to FIGS. 7–10 for this purpose, the broken snap ring assembly will be seen to comprise a snap ring carrier 10 which, in the particular form shown, has a cylindrical bore 12 containing an annular groove 14 in which is seated a conventional snap ring 16. In FIGS. 1–10 the retained part or "endplate" 18 lies closely adjacent the underside of the snap ring, so close in fact that there is no room for any sort of tool to be inserted therebeneath. The snap ring is broken as shown at 20 such that both of its end lugs (not shown) are missing or, at least that portion thereof containing the usual apertures that accept the tines of the conventional removal tool. It is such an application to which the novel removal tool of the present invention is especially suited.

Now, the first step in the removal method forming the subject matter hereof is to raise one of the ends of the ring out of its groove. Since these ends spring outward into tight contact with the base of groove 14, this is a most difficult thing to do, especially with ordinary tools. Applicants have solved this problem in a unique way by using the gap between the ends of the ring to access the base of the groove where a dimpling tool indicated in a general way by reference numeral 22 is used to place a small indentation or dimple 24 there. This dimpling tool has been shown most clearly in FIGS. 7–10 to which detailed reference will now be made, however, it is used in all of the illustrated applications shown in FIGS. 1–10, inclusive.

Figure 7:
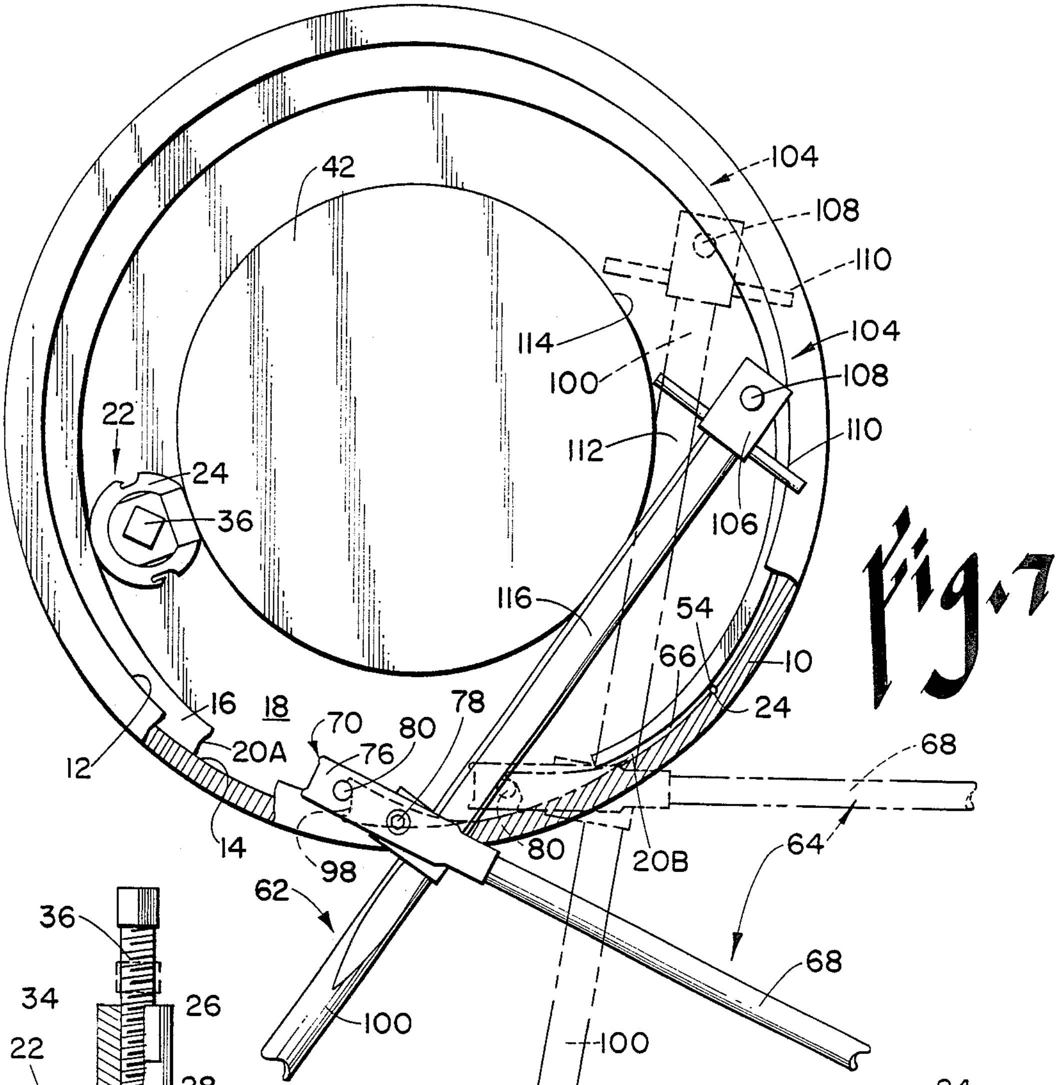
FIG. 7 is a top plan view similar to FIGS. 1 and 4 and to the same scale showing the manner in which the prying tool and wedge-driving tool are used with a large diameter center shaft and, in addition, how the dimpling tool is used in this situation to clamp the ring against rotation in the groove.
Figure 8:
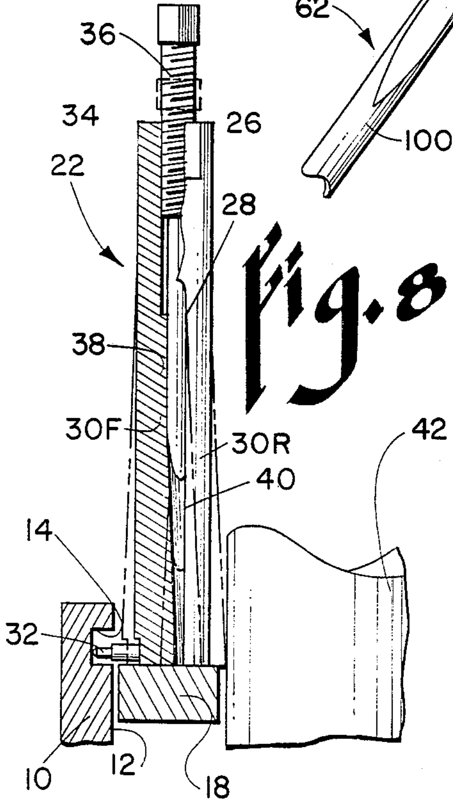
FIG. 8 is a fragmentary elevational view showing how the dimpling tool resting atop the endplate and in engagement with the centershaft is used to make a dimple in the base of the groove between the broken ends of the ring.

Basically, dimpling tool 22 comprises a clothespin-like unit 26 having a slot 28 extending from its lower end part way up so as to divide it into a pair of springable jaws 30F and 30R. The front jaw 30F has a hardened steel pin 32 projecting laterally therefrom in position to enter the groove 14 when the bottom thereof is seated atop the endplate 18 as shown in FIG. 8. Extending part way down from the top of the dimpling tool is an internally-threaded bore 34 into which is screwed a square-headed bolt or the like 36. This bore merges within slot 26 into a downwardly-tapered socket 38 housing a correspondingly-tapered plug 40 which is attached for relative rotational movement to the lower end of the bolt. As bolt 36 is screwed in from its full-line position shown in FIG. 8 into its phantom-line position, the plug 40 is lowered down into its socket 38 thus camming the jaws apart into their phantom-line position. With the rear jaw 30R abutting a large center shaft 42 in the manner shown in FIGS. 7 and 8, there is no need for a spacer tool of the type shown in FIG. 1 and identified broadly by reference numeral 44 which is used to bridge the gap between the dimpling tool and the smaller diameter center shaft 42S. Shaft 42, therefore, in the embodiment of FIGS. 7–10, comprises a fixed abutment against which the dimpling tool rests while making the dimple 24 in the base of the groove. In the version of FIG. 1, on the other hand, the spacer tool 44 consists in the particular form shown of an internally-threaded sleeve 46 into opposite ends of which screw oppositely-threaded abutment-forming parts 48 and 50 which cooperate with one another upon rotation of the sleeve to form a turnbuckle-type spacer extendable to bridge the gap left between the centershaft and the dimpling tool in the case of a small diameter centershaft. There are, of course, other adjustable-length spacers that can be used in place of the one illustrated which is intended as being merely illustrative of one that will provide the necessary abutment for use in dimpling the groove or, alternatively, holding the ring therein against rotation as shown in FIGS. 1 and 7.

Figure 9:
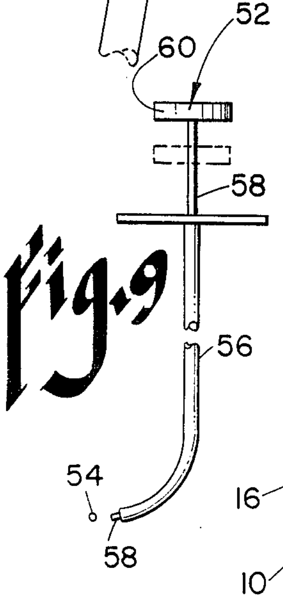
FIG. 9 is an elevational view, portions of which have been broken away to conserve space, showing one type of ball-insertion tool that can be used to place the ball into the dimple; and, FIG. 10 is a fragmentary elevational view similar to FIG. 8 but differing therefrom in that is shows the dimpling tool being used to clamp the ring against rotation as seen in FIG. 7.
Figure 10:
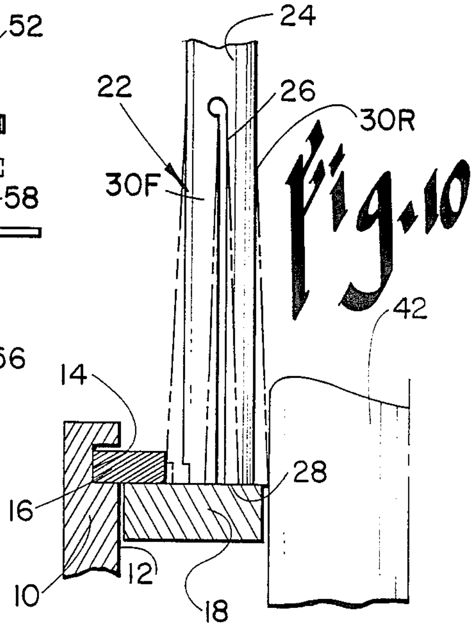

Referring next to FIG. 9, the ball-insertion tool has been shown which has been broadly indicated by reference numeral 52. The function of this tool is merely one of placing a small hardened steel ball 54 within the dimple 24 made in the groove 14 by the dimpling tool 22. As illustrated, this tool comprises a curved magazine 56 containing one or more of the balls 54 and preferable coated on the inside with some relatively viscous substance like, for example, grease to keep the balls from falling out. Inside the magazine is a flexible push-rod or plunger 58 which is extendable by pushing upon the exposed head 60 thereof to expel a ball 54 and place same in dimple 24. Ordinarily, the coating of grease on the ball will be sufficient to hold it in place within the dimple. There are, of course, other ways of getting the ball into the dimple but ball-insertion tool 52 is representative of one convenient method of doing so.

With ball 24 in place and the dimpling tool 22 removed, the next step in the method is to drive the ring around the groove until one of its broken ends rides up upon ball 24 in the manner shown most clearly in FIGS. 1, 4 and 7 to which detailed reference will next be made. While this is being done, the dimpling tool 22 shown in FIGS. 1 and 7 has been removed as have the prying tool and wedge-driving tool indicated in a general way by reference numerals 62 and 64, respectively, which will be described in detail very shortly. In other words, any blunt-bladed tool like, for example, an ordinary screwdriver can be placed against one of the broken ends 20A of the ring and it driven around clockwise as shown with a hammer until the other broken end 20B rides up on the ball 54, whereupon, a small gap 66 is produced between it and the bottom of the groove. Obviously, while this is being done, the ring must be left free to move within its groove. In the next operation, however, the ring must be secured against rotation and where a center shaft 42 (FIGS. 1, 7 and 10) blocks access to the opposite side of the bore 12, the dimpling tool 22 alone or in combination with the spacer tool 44 provide a convenient clamping subassembly once the dimpling pin 32 has been removed. More specifically, with a small diameter centershaft 42S like shown in FIG. 1, the dimpling tool 22 minus its dimpling pin 32 can be used with spacer tool 44 to bridge the space between the shaft and ring 16 thus holding the latter against rotation while the next step in the removal operation is carried out. In case a large diameter centershaft 42 is used like that shown in FIGS. 7 and 10, then the spread in the jaws 30 of the dimpling tool alone may be enough in combination with the shaft to hold the ring in place. There is yet another condition, namely, that of FIGS. 4, 5 and 6 where there is no centershaft at all and, in which case, the subassembly of the prying and wedge-driving tools are used to keep the ring from moving but this is best understood after the construction and method of using these tools has been described in detail. At this juncture it should suffice to point out that under this set up, the use of the dimpling tool with or without the spacer tool is unnecessary.

Figure 3:
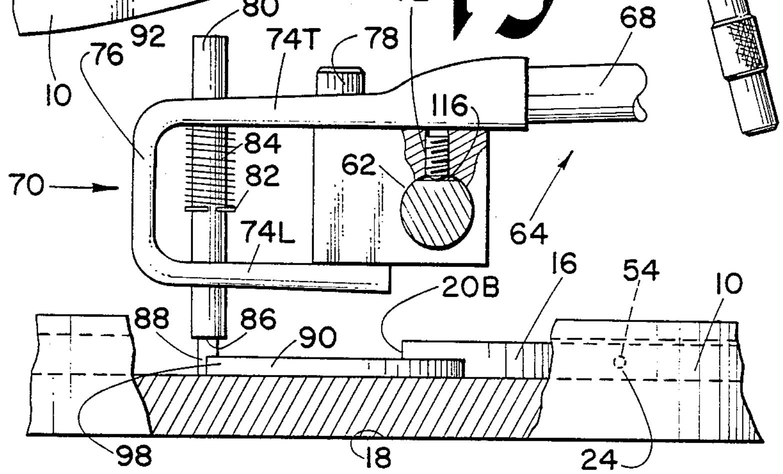
FIG. 3 is a fragmentary elevational view to the same scale as FIG. 2 showing how the wedge-driving tool engages the wedge which lifts the end of the ring free of the groove once it has been cammed away from the base thereof by the ball seated in the dimple.

While several figures of the drawing show these two tools, the wedge-driving one is most clearly revealed in FIG. 3 to which detailed reference will now be made. It will be seen to include an elongate handle 68 terminating at one end in a head subassembly indicated in a general way by reference numeral 70 and which includes a block 72 mounted between the upper and lower legs 74T and 74L, respectively, of a generally U-shaped member 76 on pivot pin 78 for movement about an axis substantially perpendicular to the plane of the snap ring 16. Further out toward the end of this U-shaped element 76 is a wedge-engaging pin 80 which in the particular form illustrated is mounted between the legs 74T and 74L for vertical reciprocating movement relative thereto in spaced substantially parallel relation to pivot pin 78. A collar 82 encircling pin 80 and a compression spring 82 between the latter and the underside of upper leg 74T cooperate to bias the pin into its extended position shown. An annular shoulder 86 near the base of the pin separates reduced section 88 thereof from the larger-diameter portion thereabove while, at the same time providing a downwardly-facing abutment effective to ride up on top of the ring and keep it from binding in the groove as it emerges therefrom.

Figure 2:
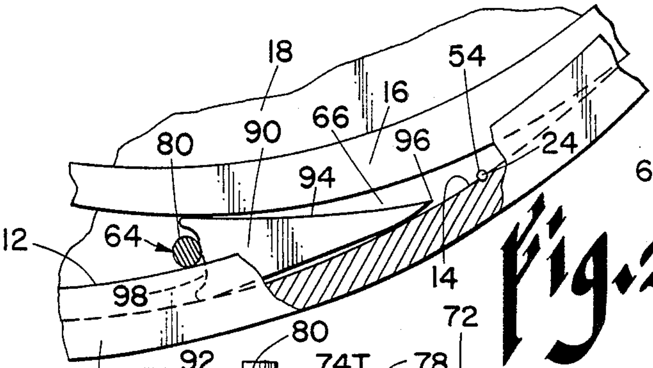
FIG. 2 is an enlarged fragmentary elevation showing how the end of the ring is cammed out of the slot as it is driven over the ball seated in the dimple that has been made in the base of the groove.

Wedge 90 is most clearly seen in FIG. 2 and it can be seen to include an outer surface 92 riding in the bottom of the groove 14 and an inner surface 94 intersecting the latter at an acute angle to form a pointed end 96 positioned and shaped to enter the gap 66 created underneath the end 20B of the snap ring as it raises up on ball 24. In the particular form shown, outer surface 92 is flattened except adjacent its pointed end to maintain essentially two-point rather than line contact with the base of the groove. Inner surface 94, on the other hand, is shown generally concave so as to provide a cam surface effective to raise the ring completely free of the groove in the manner shown in FIG. 2. End 98 of the wedge opposite the pointed end 96 thereof is notched as shown to retain the wedge-driving pin 80. Obviously, once the wedge has been driven in underneath the ring 16 a distance such that one of its ends 20B becomes accessible outside the groove 14 as seen in FIG. 2, it becomes a simple matter to pry it up away from the endplate 18 and grasp it with a pair of locking pliers or the like which can be used in the conventional manner to complete the job. In other words, it is not necessary that the wedge be driven all the way around the ring, but rather, only so far as to gain access to one of its broken ends outside the groove.

In FIGS. 1, 2, 4 and 7, it can be seen that the elongate lever arm 100 of the prying tool 62 passes through a bore 102 in the pivot block 72 of the wedge-driving tool 64, the axis of which generally parallels the plane of the ring 16. Block 72 is free to slide along arm 100 of the prying tool so as to place the wedge-driving tool in the most advantageous position to drive the wedge from a mechanical standpoint. While the wedge-driving tool is being pried upon and moved from the full line position shown in FIGS. 1, 4 and 7 into its phantom line position, the pivot block 76 is free to turn thus accommodating the constantly changing angle between arms 68 and 100. It is important to remember that all the while this wedge-driving operation is taking place that the ring is secured against rotation within its groove.

The prying tool like the wedge-driving tool also includes a head subassembly on one end thereof, the latter having been broadly designated by reference numeral 104 and which can be seen to include a block 106 fixedly attached to the end of lever arm 100 mounting both a vertically-disposed pin 108 and a horizontally-disposed one 110. In applications like shown in FIGS. 1 and 7 where a centershaft is present, pin 108 has no particular function while the block 106 and one of the arms of pin 110 cooperate to define a series of four V-shaped notches 112 encircling the block, one of which receives the cylindrical surface 114 of the shaft as shown and cooperates therewith to produce a fulcrum movable around the centershaft that provides the fixed abutment which is pried against as the prying tool is forced from its full line into its phantom-line position pulling the wedge-driving tool and wedge along with it. In actual practice, both the wedge-driving tool and the prying tool are grasped by the operator and manipulated together as an integral subassembly when driving the wedge. A flat 116 is shown atop the lever arm 100 and it can be used with a suitable set screw (not shown) within the block 72 to releasably lock the wedge-driving tool to a fixed location along the handle of the prying tool.

Figure 4:
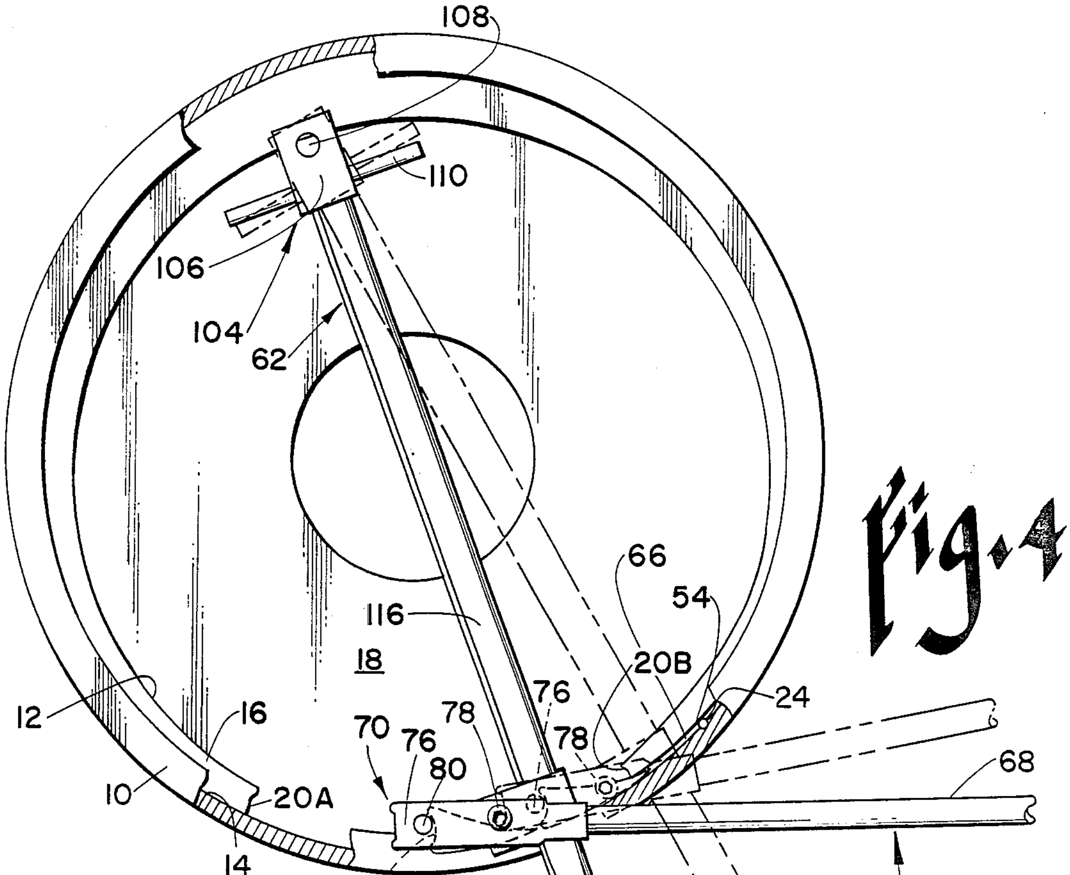
FIG. 4 is a plan view similar to FIG. 1 and to the same scale but differing therefrom in that the assembly has no center shaft and the prying tool is relocated to engage the opposite wall of the bore.
Figure 6:
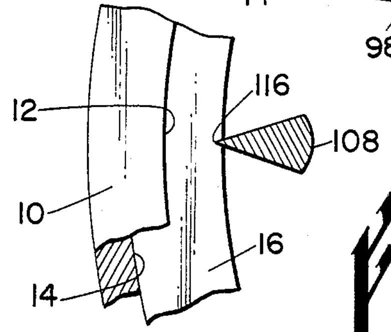
FIG. 6 is a a fragmentary section taken along line 6—6 of FIG. 5.
Figure 5:
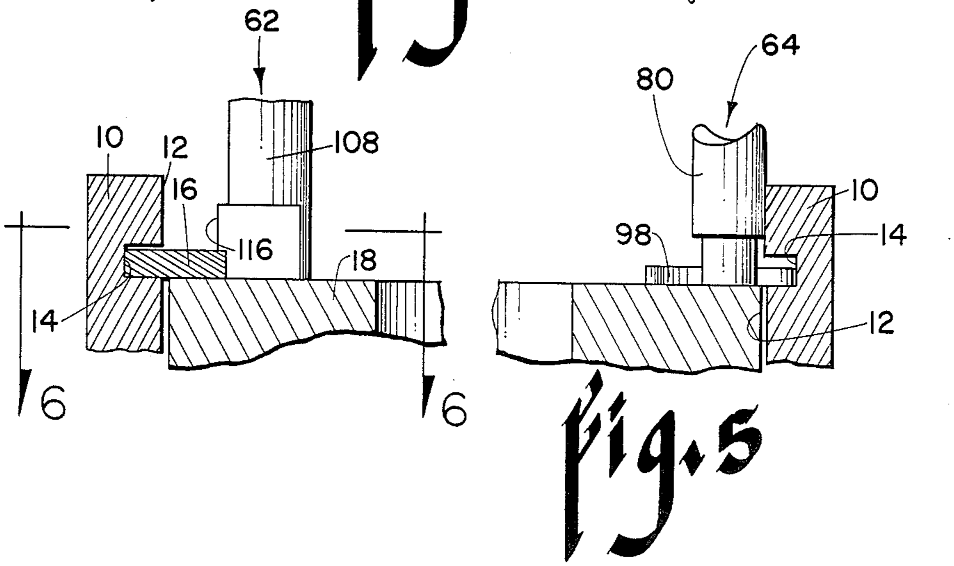
FIG. 5 is a greatly enlarged fragmentary elevation showing how the remote end of the prying tool digs into the exposed medial section of the broken ring to provide the fulcrum used in forcing the wedge in underneath one of its ends.

Finally with specific reference to FIGS. 4, 5 and 6, a construction is shown in which pin 108 is used to both force the ring into its groove and to provide the fulcrum about which the prying tool is pivoted for use in those applications where there is no centershaft to pry against. In FIGS. 5 and 6 it will be seen that a portion of pin 108 that projects beneath the block 106 contains an integrally-formed knife-edged projection 116 capable of being driven into the inner edge of the ring in the manner shown. Now, contrary to the applications of FIGS. 1 and 7, in the application of FIG. 4 the wedge-driving tool must be secured to the lever arm 100 of the prying tool since it is the wedge-driving tool that must be urged in the direction of the opposite side of the bore to hold the knife-edged pin 108 tightly against the ring so as to keep the latter from moving around the groove and also to provide a fixed fulcrum to pry against.

What is claimed is:

1. The multiple-too apparatus for removing lugless snap rings from the internal annular grooves provided therefor in parts containing cylindrical bores which comprises: means for indenting the groove intermediate the ends of the snap ring to receive a ball, a ball for seating in the groove indentation, means for driving the ring around in its groove to a position where one end thereof has raised up upon the ball seated in the indentation to create a gap therebeneath, a wedge for insertion into the gap, means for securing the ring non-rotatably within its groove, and means for driving the wedge into the gap beneath the raised end of the ring as so to pry the latter free of its groove.

2. The lugless snap ring removal multiple-tool apparatus as set forth in claim 1 wherein: the means for indenting the groove comprises an expandable-jawed tool, said tool having a first jaw positionable against a fixed abutment arranged in opposed relation to the gap between the ring ends, a second jaw movable away from said first jaw toward the groove intermediate the ring ends, and means located between the first and second jaws operative upon actuation to spread the latter apart; and, a pin carried by said second jaw for movement therewith into the groove for placing an indentation therein when said jaws are actuated into spread position.

3. The lugless snap ring removal multiple-tool apparatus as set forth in claim 1 wherein: the means for holding the ring non-rotatably within its groove comprises an expandable spacer of a length adapted to bridge the gap between said ring and a fixed abutment encircled thereby.

4. The lugless snap ring removal multiple-tool apparatus as set forth in claim 1 wherein: the means for driving the wedge into the gap beneath the end of the ring that has raised up upon the ball comprises means defining an elongate rigid lever arm having a first portion seatable against a fixed abutment spaced to one side of said raised end, and means depending from a second portion of said lever arm spaced from said first portion positioned and adapted to engage said wedge and drive same into the gap upon movement of said second portion of said lever arm toward said gap using the first portion thereof as a fulcrum.

5. The lugless snap ring removal multiple-tool apparatus as set forth in claim 4 wherein: notch-deining means is carried by the first portion of the lever arm shaped to receive and move around the cylindrical surface of a centershaft rising through the ring and defining a fixed abutment for said arm to pry against.

6. The lugless snap ring removal multiple-tool apparatus as as set forth in claim 4 wherein: knife-edged means is carried by the first portion of the lever arm adapted to define a fulcrum for pivotal movement thereof when forced against a surface located in opposed relation to the raised end of said ring.

7. The lugless snap ring removal multiple-tool apparatus as set forth in claim 1 wherein: said multiple-tool apparatus includes means for inserting the ball into the indentation in the snap ring groove.

8. The lugless snap ring removal multiple-tool apparatus as set forth in claim 5 wherein: the means for inserting the ball into the indentation in the snap ring groove comprises an elongate tubular ball reservoir open at one end and closed at the other, at least one ball within said reservoir, and plunger means at the closed end of said reservoir operative upon actuation to eject a ball from the open end thereof.

9. The lugless snap ring removal tools as set forth in claim 8 wherein: the ball reservoir is lined with a greasy material adapted to releasably retain the balls therein while coating the latter so that they stick in the snap ring groove indentation.

10. The method for removing lugless snap rings from the internal annular grooves provided therefor in parts containing cylindrical bores which comprises the steps of: making an indentation in a space left in the bottom of the groove between the ends of the ring, placing a ball in the indentation thus formed, moving the ring around in its groove until one of its ends rides up upon the ball to create a gap therebeneath, holding the ring in its groove against further relative rotation, driving a wedge underneath the raised end of the ring to pry the latter free of its groove, and removing the ring by pulling upon the end thus freed.

* * * * *